United States Patent
No (10) Patent No.: US 9,522,657 B2
(45) Date of Patent: Dec. 20, 2016

(54) APPARATUS AND METHOD FOR CONTROLLING ELECTRONIC PARKING BRAKE

(71) Applicant: MANDO CORPORATION, Gyeonggi-do (KR)

(72) Inventor: Su-Hwan No, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 15/009,787

(22) Filed: Jan. 28, 2016

(65) Prior Publication Data

US 2016/0221547 A1    Aug. 4, 2016

(30) Foreign Application Priority Data

Feb. 3, 2015  (KR) .......................... 10-2015-0016444

(51) Int. Cl.
*B60T 7/12*  (2006.01)
*B60T 13/74* (2006.01)
(Continued)

(52) U.S. Cl.
CPC ................. *B60T 7/12* (2013.01); *B60T 8/171* (2013.01); *B60T 13/74* (2013.01); *B60T 7/122* (2013.01); *B60W 10/192* (2013.01)

(58) Field of Classification Search
CPC ............ B60T 7/12; B60T 7/122; B60T 13/74; B60T 8/171; B60W 10/192
See application file for complete search history.

(56) References Cited

U.S. PATENT DOCUMENTS

| | | | |
|---|---|---|---|
| 5,667,282 A * | 9/1997 | Kim .................... | B60T 13/745 192/222 |
| 2004/0113486 A1* | 6/2004 | Koga .................... | B60T 7/107 303/20 |

(Continued)

FOREIGN PATENT DOCUMENTS

| | | |
|---|---|---|
| JP | 11-348748 | 12/1999 |
| JP | 2012-66651 | 4/2012 |

(Continued)

OTHER PUBLICATIONS

Office Action dated Oct. 27, 2015 for Korean Patent Application No. 10-2015-0016444.

(Continued)

*Primary Examiner* — Michael J Zanelli
(74) *Attorney, Agent, or Firm* — Ladas & Parry, LLP (57) ABSTRACT

An apparatus and method of controlling an electronic parking brake comprising detecting current wheel pulse counting signals when a vehicle rolls at a predetermined time interval for a predetermined time period after a parking operation for parking is clamped, receiving the detected current wheel pulse counting signals continuously at a predetermined time interval for a next time period after the predetermined time period and detecting the continuously-cumulated current wheel pulse cumulative counting signals; determining whether the detected current wheel pulse counting signals are predetermined target wheel pulse counting signals or determining whether the detected current wheel pulse cumulative counting signals are predetermined target wheel pulse cumulative counting signals; and if it is determined that the current wheel pulse counting signals or the current wheel pulse cumulative counting signals are the target counting signals, respectively, driving the electronic parking brake so as to re-clamp the parking operation.

17 Claims, 9 Drawing Sheets

(51) Int. Cl.
*B60T 8/171* (2006.01)
*B60W 10/192* (2012.01)

(56) References Cited

U.S. PATENT DOCUMENTS

| 2014/0149012 | A1* | 5/2014 | Shiraki | B60T 7/12 |
| | | | | 701/70 |
| 2016/0176388 | A1* | 6/2016 | Baehrle-Miller | B60T 8/171 |
| | | | | 701/70 |

FOREIGN PATENT DOCUMENTS

| KR | 10-2007-0120331 | 12/2007 |
| KR | 10-2014-0071120 | 6/2014 |

OTHER PUBLICATIONS

Notice of Allowance dated Mar. 22, 2016 for Korean Patent Application No. 10-2015-0016444 and its English summary provided by Applicant's foreign counsel.

\* cited by examiner

APPARATUS AND METHOD FOR CONTROLLING ELECTRONIC PARKING BRAKE

CROSS-REFERENCE TO RELATED APPLICATION

This application claims the priority to Korean Patent Application No. 10-2015-0016444, filed on Feb. 3, 2015 in the Korean Intellectual Property Office, the disclosure of which is incorporated herein by reference in its entirety.

BACKGROUND

1. Field

Embodiments of the present invention relate to an apparatus and method for controlling an electronic parking brake.

2. Description of the Related Art

In general, an electronic parking brake according to the related art has been provided in such a way that, when a driver turns off starting using a driver-friendly automatic brake device, the brake operates automatically and when the driver steps on an accelerator while turning on starting, the brake is automatically released such that conveniences of parking are improved.

However, in the electronic parking brake according to the related art, when the driver does not quickly recognize a state in which a vehicle rolls in a rear direction, a parking state is not smoothly formed after parking has been performed such that there is a limitation in improvements in conveniences of parking.

Thus, these days, research into an apparatus and method for controlling an electronic parking brake having an improved structure in which conveniences of parking can be improved without the need of continuously considering whether the parking state is smoothly formed after parking has been performed, which allows the driver to identify that a current parking state is unstable and to take a fast initial countermeasure and allows the driver to identify a future parking state and the current parking state are stable so that reliability of parking can be further improved, has been continuously carried out.

SUMMARY

Therefore, it is an aspect of the present invention to provide an apparatus and method for controlling an electronic parking brake, whereby conveniences of parking can be improved.

It is another aspect of the present invention to provide an apparatus and method for controlling an electronic parking brake, whereby a driver is able to recognize that a current parking state is unstable and to take a fast initial countermeasure.

It is another aspect of the present invention to provide an apparatus and method for controlling an electronic parking brake, whereby a driver is able to recognize that a future parking state is stable so that reliability of parking can be further improved.

It is another aspect of the present invention to provide an apparatus and method for controlling an electronic parking brake, whereby a driver is able to recognize that a current parking state is stable so that reliability of parking can be further improved.

Additional aspects of the invention will be set forth in part in the description which follows and, in part, will be obvious from the description, or may be learned by a practice of the invention.

In accordance with one aspect of the present invention, an apparatus for controlling an electronic parking brake, includes: a first detection unit that detects current wheel pulse counting signals when a vehicle rolls at a predetermined time interval for a predetermined time period after a parking operation for parking is clamped; a second detection unit that continuously receives the detected current wheel pulse counting signals at a predetermined time interval for a next time period after the predetermined time period and detects the continuously-cumulated current wheel pulse cumulative counting signals; a determination unit that determines whether the detected current wheel pulse counting signals are predetermined target wheel pulse counting signals or determines whether the detected current wheel pulse cumulative counting signals are predetermined target wheel pulse cumulative counting signals; a driving unit that drives the electronic parking brake so as to re-clamp the parking operation if it is determined that the current wheel pulse counting signals are the target wheel pulse counting signals or the current wheel pulse cumulative counting signals are the target wheel pulse cumulative counting signals; and a controller that transmits a first detection instruction to the first detection unit, transmits a second detection instruction to the second detection unit, transmits a determination instruction to the determination unit and transmits a driving instruction to the driving unit.

The controller may further transmit a reset instruction to the second detection unit so as to reset the current wheel pulse cumulative counting signals if the current wheel pulse counting signals are the target wheel pulse counting signals.

The controller may further transmit a reset instruction to the first detection unit so as to reset the current wheel pulse counting signals if the current wheel pulse cumulative counting signals are the target wheel pulse cumulative counting signals.

The first detection unit may further detect the current wheel pulse counting signals in real time while a turn-on state of the controller is maintained even when starting of a vehicle is turned off.

The second detection unit may further detect the current wheel pulse cumulative counting signals in real time while a turn-on state of the controller is maintained even when starting of a vehicle is turned off.

The apparatus may further include a communication unit that communicates with a driver's portable mobile terminal device according to control of the controller, wherein, if the current wheel pulse counting signals are not the target wheel pulse counting signals, the communication unit may transmit communication signals to the driver's portable mobile terminal device so that the driver's portable mobile terminal device identifies that a current parking state is unstable.

The apparatus may further include a communication unit that communicates with a driver's portable mobile terminal device according to control of the controller, wherein, if the current wheel pulse cumulative counting signals are not the target wheel pulse cumulative counting signals, the communication unit may transmit communication signals to the driver's portable mobile terminal device so that the driver's portable mobile terminal device identifies that a current parking state is unstable.

The apparatus may further include a communication unit that communicates with a driver's portable mobile terminal device according to control of the controller, wherein, if the current wheel pulse counting signals are the target wheel pulse counting signals, the communication unit may transmit communication signals to the driver's portable mobile terminal device so that the driver's portable mobile terminal device identifies that a current situation is a situation in which the parking operation is to be re-clamped.

The apparatus may further include a communication unit that communicates with a driver's portable mobile terminal device according to control of the controller, wherein, if the current wheel pulse cumulative counting signals are the target wheel pulse cumulative counting signals, the communication unit may transmit communication signals to the driver's portable mobile terminal device so that the driver's portable mobile terminal device identifies that a current situation is a situation in which the parking operation is to be re-clamped.

The apparatus may further include a communication unit that communicates with a driver's portable mobile terminal device according to control of the controller, wherein the communication unit may transmit communication signals to the driver's portable mobile terminal device so that the driver's portable mobile terminal device identifies that a current parking state is stable, when the parking operation is to be re-clamped.

The first detection unit may detect wheel pulse signals, and the second detection unit may detect signals excluding the wheel pulse signals.

The controller may perform a plurality of re-clamping operations.

In accordance with another aspect of the present invention, a method of controlling an electronic parking brake, includes: detecting current wheel pulse counting signals when a vehicle rolls at a predetermined time interval for a predetermined time period after a parking operation for parking is clamped, or receiving the detected current wheel pulse counting signals continuously at a predetermined time interval for a next time period after the predetermined time period and detecting the continuously-cumulated current wheel pulse cumulative counting signals; determining whether the detected current wheel pulse counting signals are predetermined target wheel pulse counting signals or determining whether the detected current wheel pulse cumulative counting signals are predetermined target wheel pulse cumulative counting signals; and if it is determined that the current wheel pulse counting signals are the target wheel pulse counting signals or the current wheel pulse cumulative counting signals are the target wheel pulse cumulative counting signals, driving the electronic parking brake so as to re-clamp the parking operation.

In the driving operation, the current wheel pulse cumulative counting signals may be reset if the current wheel pulse counting signals are the target wheel pulse counting signals.

In the driving operation, the current wheel pulse counting signals may be reset if the current wheel pulse cumulative counting signals are the target wheel pulse cumulative counting signals.

In the detecting operation, the current wheel pulse counting signals may be further detected in real time while a turn-on state of the controller is maintained even when starting of a vehicle is turned off.

In the detecting operation, the current wheel pulse cumulative counting signals may be further detected in real time while a turn-on state of the controller is maintained even when starting of a vehicle is turned off.

A controller may be provided to the vehicle, and the method may further include communicating with a driver's portable mobile terminal device according to control of the controller, wherein, in the communicating operation, if the current wheel pulse counting signals are not the target wheel pulse counting signals, communication signals may be transmitted to the driver's portable mobile terminal device so that the driver's portable mobile terminal device identifies that a current parking state is unstable.

A controller may be provided to the vehicle, and the method may further include communicating with a driver's portable mobile terminal device according to control of the controller, wherein, in the communicating operation, if the current wheel pulse cumulative counting signals are not the target wheel pulse cumulative counting signals, communication signals may be transmitted to the driver's portable mobile terminal device so that the driver's portable mobile terminal device identifies that a current parking state is unstable.

A controller may be provided to the vehicle, and the method may further include communicating with a driver's portable mobile terminal device according to control of the controller, wherein, in the communicating operation, if the current wheel pulse counting signals are the target wheel pulse counting signals, communication signals may be transmitted to the driver's portable mobile terminal device so that the driver's portable mobile terminal device identifies that a current situation is a situation in which the parking operation is to be re-clamped.

A controller may be provided to the vehicle, and the method may further include communicating with a driver's portable mobile terminal device according to control of the controller, wherein, in the communicating operation, if the current wheel pulse cumulative counting signals are the target wheel pulse cumulative counting signals, communication signals may be transmitted to the driver's portable mobile terminal device so that the driver's portable mobile terminal device identifies that a current situation is a situation in which the parking operation is to be re-clamped.

A controller may be provided to the vehicle, and the method may further include communicating with a driver's portable mobile terminal device according to control of the controller, wherein, in the communicating operation, communication signals may be transmitted to the driver's portable mobile terminal device so that the driver's portable mobile terminal device identifies that a current parking state is stable, when the parking operation is to be re-clamped.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiments of the present invention, hereinafter, examples of which are illustrated in the accompanying drawings, wherein like reference numerals refer to like elements throughout. The following embodiment is proposed to sufficiently convey the spirit of the invention to one of ordinary skill in the art. The invention is not limited by the proposed embodiment but may be embodied in different shapes. In the drawings, for clarity, illustration of unrelated parts to description is omitted, and for understanding, sizes of components may be slightly exaggerated.

Figure 1:
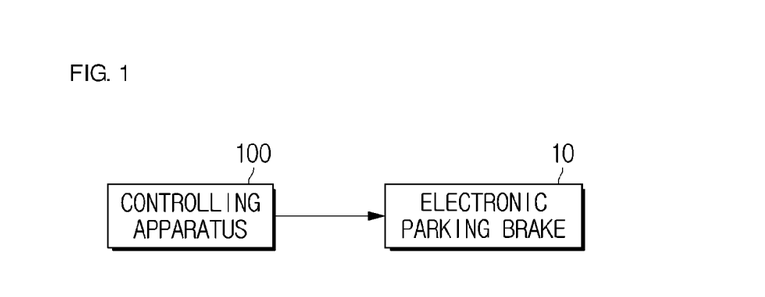
FIG. 1 is a block diagram illustrating a state in which an apparatus for controlling an electronic parking brake in accordance with a first embodiment of the present invention is connected to the electronic parking brake.
Figure 2:
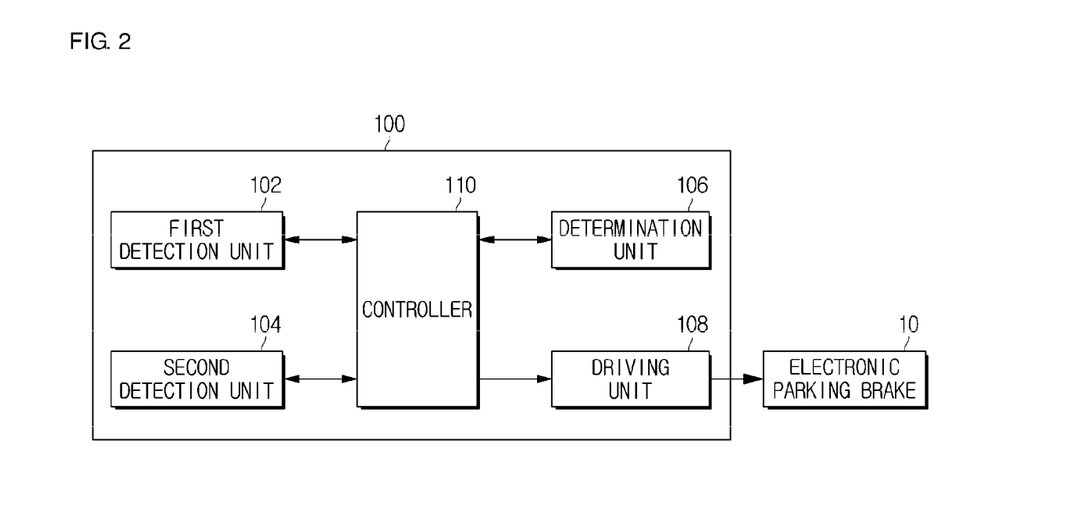
FIG. 2 is a block diagram illustrating the apparatus illustrated in FIG. 1, in one example.

FIG. 1 is a block diagram illustrating a state in which an apparatus for controlling an electronic parking brake in accordance with a first embodiment of the present invention is connected to the electronic parking brake, and FIG. 2 is a block diagram illustrating the apparatus illustrated in FIG. 1, in one example.

Figure 3:
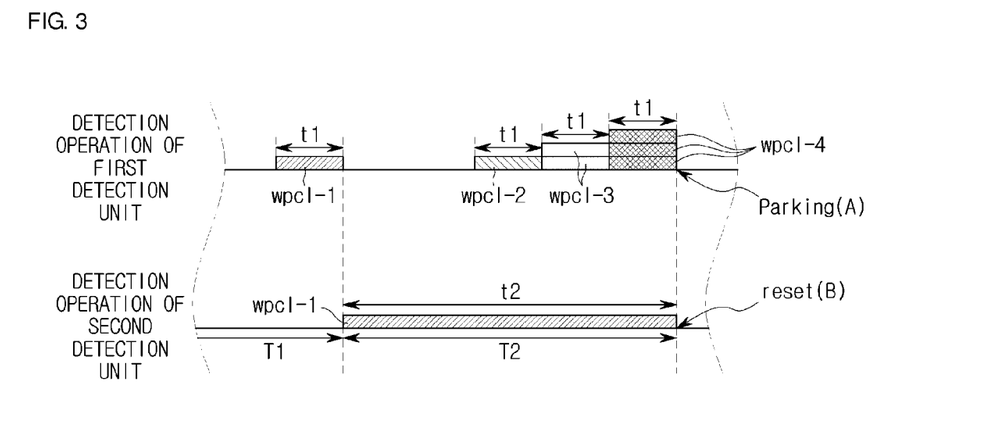
FIG. 3 is a view illustrating a state in which a parking operation caused by a detection operation performed by a first detection unit illustrated in FIG. 2 is re-clamped.
Figure 4:
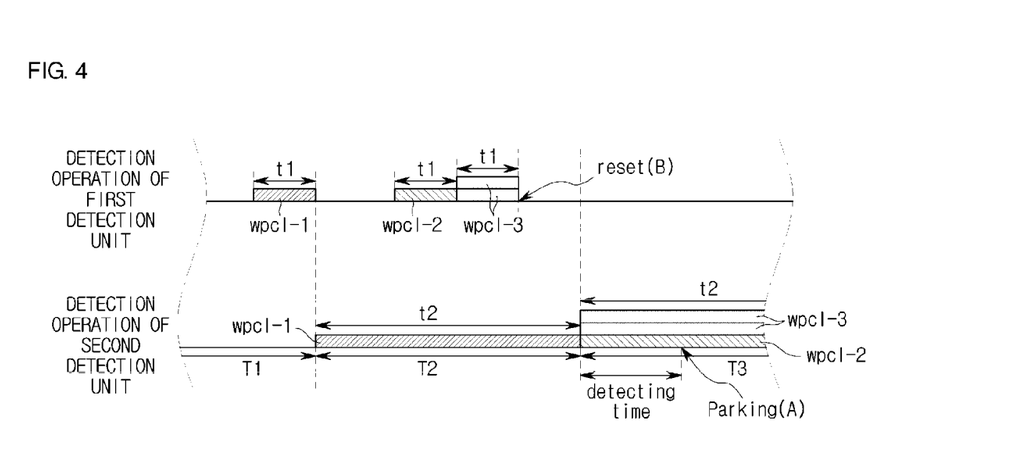
FIG. 4 is a view illustrating a state in which a parking operation caused by a detection operation performed by a second detection unit illustrated in FIG. 2 is re-clamped.

FIG. 3 is a view illustrating a state in which a parking operation caused by a detection operation performed by a first detection unit illustrated in FIG. 2 is re-clamped, and FIG. 4 is a view illustrating a state in which a parking operation caused by a detection operation performed by a second detection unit illustrated in FIG. 2 is re-clamped.

Referring to FIGS. 1 through 4, an apparatus 100 for controlling an electronic parking brake 10 in accordance with a first embodiment of the present invention includes a first detection unit 102, a second detection unit 104, a determination unit 106, a driving unit 108, and a controller 110.

After clamping a parking operation for parking, the first detection unit 102 detects current wheel pulse counting signals WPCI-1 through WPCI-4 in a detection operation of the first detection unit 102 of FIGS. 3 and 4) when a vehicle rolls in a rear direction at a predetermined time interval (t1 of FIGS. 3 and 4) for predetermined time periods (T1 and T2 of FIGS. 3 and 4).

Here, the first detection unit 102 may detect the current wheel pulse counting signals (WPCI-1 through WPCI-4 in the detection operation of the first detection unit 102 of FIGS. 3 and 4) while maintaining a turn-on state of the controller 110 that will be described later even when starting of the vehicle is turned off.

In this case, although not shown, the first detection unit 102 may be a wheel pulse counting sensor (not shown) for detecting the current wheel pulse counting signals (WPCI-1 through WPCI-4 in the detection operation of the first detection unit 102 of FIGS. 3 and 4) in real time. Embodiments of the present invention are not limited thereto, and the first detection unit 102 may be one of all detection units for detecting current wheel pulse counting signals in real time.

Thus, the first detection unit 102 may be one of all detection units for detecting wheel pulse counting signals in real time.

The second detection unit 104 continuously receives the current wheel pulse counting signals (WPCI-1 through WPCI-4 in the detection operation of the first detection unit 102 of FIGS. 3 and 4) detected by the first detection unit 102 at a predetermined time interval (t2 of FIGS. 3 and 4) for next time periods (T2 and T3 of FIGS. 3 and 4) after the predetermined time periods (T1 and T2 of FIGS. 3 and 4) and detects the continuously-cumulated, current wheel pulse cumulative counting signals (WPCI-1 through WPCI-3 in a detection operation of the second detection unit 104 of FIGS. 3 and 4).

Here, the second detection unit 104 may further detect the current wheel pulse cumulative counting signals WPCI-1 through WPCI-3 in the detection operation of the second detection unit 104 of FIGS. 3 and 4) in real time while maintaining a turn-on state of the controller 110 even when starting of the vehicle is turned off.

In this case, although not shown, the second detection unit 104 may be a wheel pulse cumulative counting sensor (not shown) for detecting the current wheel pulse cumulative counting signals (WPCI-1 through WPCI-3 in the detection operation of the second detection unit 104 of FIGS. 3 and 4) in real time. Embodiments of the present invention are not limited thereto, and the second detection unit 104 may be one of all detection units for detecting the current wheel pulse cumulative counting signals in real time.

Thus, the second detection unit 104 may be one of all detection units for detecting all signals including noise except for wheel pulse signals in real time.

The determination unit 106 determines whether the current wheel pulse counting signals (WPCI-1 through WPCI-4 in the detection operation of the first detection unit 102 of FIGS. 3 and 4) detected by the first detection unit 102 are predetermined target wheel pulse counting signals or determines whether the current wheel pulse cumulative counting signals (WPCI-1 through WPCI-3 in the detection operation of the second detection unit 104 of FIGS. 3 and 4) detected by the second detection unit 104 are the predetermined target wheel pulse cumulative signals.

The driving unit 108 drives the electronic parking brake 10 so as to re-clamp (A of FIG. 3) the parking operation, if the determination unit 106 determines that the current wheel pulse counting signal (WPCI-4 in the detection operation of the first detection unit 102 of FIG. 3) is a target wheel pulse counting signal.

In one example, the driving unit 108 may drive the electronic parking brake 10 so as to re-clamp (A of FIG. 3) the parking operation, if the number of times being cumulated of the current wheel pulse counting signal (WPCI-4 in the detection operation of the first detection unit 102 of FIG. 3) determined by the determination unit 106 is three that is the number of times being cumulated of the target wheel pulse counting signals.

In addition, the driving unit 108 drives the electronic parking brake 10 so as to re-clamp (A of FIG. 4) the parking operation, if the determination unit 106 determines that the current wheel pulse cumulative counting signals WPCI-2 and WPCI-3 in the detection operation of the second detection unit of FIG. 4) are the target wheel pulse cumulative counting signals.

In one example, the driving unit 108 may drive the electronic parking brake 10 so as to re-clamp (A of FIG. 4) the parking operation, if the number of times being cumulated of the current wheel pulse counting signals (WPCI-2 and WPCI-3 in the detection operation of the second detection unit of FIG. 4) determined by the determination unit 106 is three that is the number of times being cumulated of the target wheel pulse counting signals.

The controller 110 transmits a first detection instruction to the first detection unit 102, transmits a second detection instruction to the second detection unit 104, transmits a determination instruction to the determination unit 106, and transmits a driving instruction to the driving unit 108.

In this case, the controller 110 may further transmit a reset instruction to the second detection unit 104 so as to reset (B of FIG. 3) the current wheel pulse cumulative counting signal (WPCI-1 in the detection operation of the second detection unit of FIG. 3), if the determination unit 106 determines that the current wheel pulse counting signal (WPCI-4 in the detection operation of the first detection unit 102 of FIG. 3) is the target wheel pulse counting signals.

In one example, the controller 110 may further transmit the reset instruction to the second detection unit 104 so as to reset (B of FIG. 3) the current wheel pulse cumulative counting signal (WPCI-1 in the detection operation of the first detection unit of FIG. 3), if the number of times being cumulated of the current wheel pulse counting signal (WPCI-4 in the detection operation of the first detection unit 102 of FIG. 3) determined by the determination unit 106 is three that is the number of times being cumulated of the target wheel pulse counting signals.

In addition, the controller 110 may further transmit the reset instruction to the first detection unit 102 so as to reset (B of FIG. 4) the current wheel pulse counting signals (WPCI-2 and WPCI-3 in the detection operation of the second detection unit 104 of FIG. 4), if the determination unit 106 determines that the current wheel pulse cumulative counting signals (WPCI-2 and WPCI-3 in the detection operation of the second detection unit 104 of FIG. 4) are the target wheel pulse cumulative counting signals.

In one example, the controller 110 may further transmit the reset instruction to the first detection unit 102 so as to reset (B of FIG. 4) the current wheel pulse counting signals (WPCI-2 and WPCI-3 in the detection operation of the first detection unit 102 of FIG. 4), if the number of times being cumulated of the current wheel pulse counting signals (WPCI-2 and WPCI-3 in the detection operation of the second detection unit 104 of FIG. 4) determined by the determination unit 106 is three that is the number of times being cumulated of the target wheel pulse counting signals.

Here, although the determination unit 106, the driving unit 108 and the controller 110 are not shown, a general electric control unit (ECU)(not shown) that controls and determines the entire operation of the vehicle and drives the electronic parking brake 10 may be provided to a main computer applied to the vehicle.

In addition, although the determination unit 106, the driving unit 108 and the controller 110 are not shown, a general micro control unit (MCU)(not shown) that controls and determines the entire operation of the vehicle and drives the electronic parking brake 10 may be provided to the main computer applied to the vehicle.

In addition, the determination unit 106, the driving unit 108, and the controller 110 are not limited thereto, and all kinds of control units, determination units and driving units that control and determine the entire operation of the vehicle and drive the electronic parking brake 10 may be provided.

Here, an integrated type ECU (not shown) or MCU (not shown) having an integrated function of the determination unit 106, the driving unit 108 and the controller 110 may be provided, or a separable ECU (not shown) or MCU (not shown) having a separated function of the determination unit, the driving unit 108 and the controller 110 may also be provided.

A method of controlling the electronic parking brake 10 by using the apparatus 100 for controlling the electronic parking brake 10 in accordance with the first embodiment of the present invention will be described with reference to FIG. 5.

Figure 5:
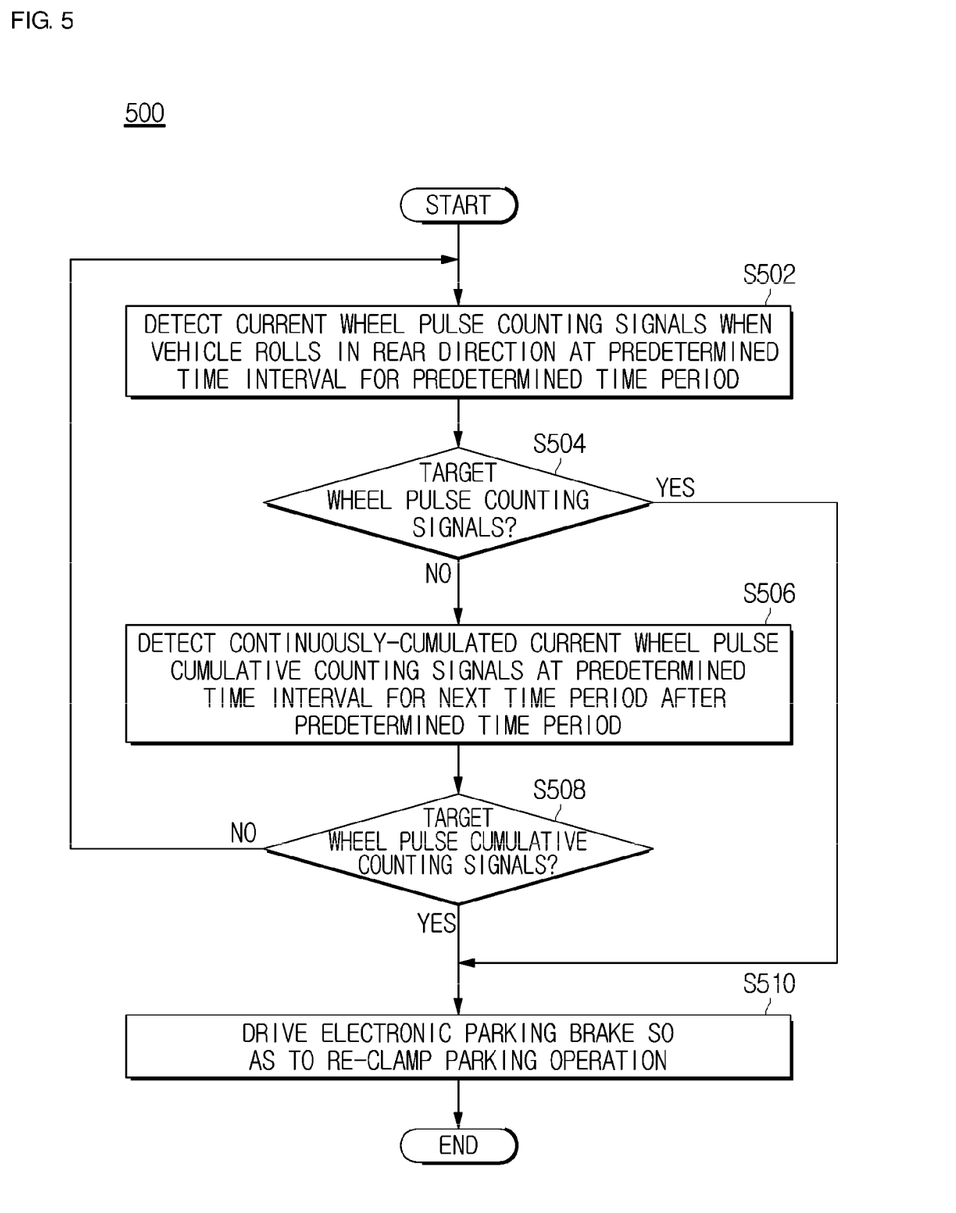
FIG. 5 is a flowchart illustrating a method of controlling an electronic parking brake by using the apparatus for controlling an electronic parking brake in accordance with the first embodiment of the present invention, in one example.

FIG. 5 is a flowchart illustrating a method of controlling an electronic parking brake by using the apparatus for controlling an electronic parking brake in accordance with the first embodiment of the present invention, in one example.

Referring to FIG. 5, a method 500 of controlling the electronic parking brake 10 by using the apparatus 100 for controlling the electronic parking brake 10 in accordance with the first embodiment of the present invention includes detection operations S502 and S506, determination operations S504 and S508, and a driving operation S510.

First, in the detection operation S502, after a parking operation for parking is clamped, the first detection unit (102 of FIG. 2) detects current wheel pulse counting signals (WPCI-1 through WPCI-4 in the detection operation of the first detection unit 102 of FIGS. 3 and 4) when the vehicle rolls in a rear direction at a predetermined time interval (t1 of FIGS. 3 and 4) for predetermined time periods (T1 and T2 of FIGS. 3 and 4) according to control of the controller (110 of FIG. 2).

Here, in the detection operation S502, while maintaining a turn-on state of the controller (110 of FIG. 2) even when starting of the vehicle is turned off, the first detection unit (102 of FIG. 2) may further detect the current wheel pulse counting signals (WPCI-1 through WPCI-4 in the detection operation of the first detection unit 102 of FIGS. 3 and 4) in real time according to control of the controller (110 of FIG. 2).

Subsequently, in the determination operation S504, the determination unit (106 of FIG. 2) determines whether the current wheel pulse counting signals (WPCI-1 through WPCI-4 in the detection operation of the first detection unit 102 of FIGS. 3 and 4) detected by the first detection unit (102 of FIG. 2) are predetermined target wheel pulse counting signals, according to control of the controller (110 of FIG. 2).

In one example, in the determination operation S504, the determination unit (106 of FIG. 2) may determine whether the number of times being cumulated of the current wheel pulse counting signals (WPCI-1 through WPCI-4 in the detection operation of the first detection unit 102 of FIGS. 3 and 4) detected by the first detection unit (102 of FIG. 2) is three that is the number of times being cumulated of the target wheel pulse counting signals, according to control of the controller (110 of FIG. 2).

Subsequently, in the detection operation S506, the second detection unit (104 of FIG. 2) continuously receives the current wheel pulse counting signals (WPCI-1 through WPCI-4 in the detection operation of the first detection unit 102 of FIGS. 3 and 4) detected by the first detection unit (102 of FIG. 2) at a predetermined time interval (t2 of FIGS. 3 and 4) for next time periods (T2 and T3 of FIGS. 3 and 4) after predetermined time periods (T1 and T2 of FIGS. 3 and 4) and detects the continuously-cumulated, current wheel pulse cumulative counting signals (WPC1-1 through WPC1-3 in the detection operation of the second detection unit 104 of FIGS. 3 and 4) according to control of the controller (110 of FIG. 2).

Here, in the detection operation S506, while maintaining the turn-on state of the controller (110 of FIG. 2) even when starting of the vehicle is turned off, the second detection unit (104 of FIG. 2) may further detect the current wheel pulse cumulative counting signals (WPCI-1 through WPCI-3 in the detection operation of the second detection unit 104 of FIGS. 3 and 4) in real time according to control of the controller (110 of FIG. 2).

Subsequently, in the determination operation S508, the determination unit (106 of FIG. 2) determines whether the current wheel pulse cumulative counting signals (WPCI-1 through WPCI-3 in the detection operation of the second detection unit 104 of FIGS. 3 and 4) detected by the second detection unit (104 of FIG. 2) are predetermined target wheel pulse cumulative counting signals.

In one example, in the determination operation S508, the determination unit (106 of FIG. 2) may determine whether the number of times being cumulated of the current wheel pulse counting signals (WPCI-1 through WPCI-3 in the detection operation of the second detection unit 104 of FIGS. 3 and 4) detected by the second detection unit (104 of FIG. 2) is three that is the number of times being cumulated of the target wheel pulse counting signals, according to control of the controller (110 of FIG. 2).

Subsequently, in the driving operation S510, if the determination unit (106 of FIG. 2) determines that the current wheel pulse counting signal (WPCI-4 in the detection operation of the first detection unit 102 of FIG. 3) is the target wheel pulse counting signal, the driving unit (108 of FIG. 2) drives the electronic parking brake (10 of FIG. 2) according to control of the controller (110 of FIG. 2) so as to re-clamp (A of FIG. 3) the parking operation.

In one example, in the driving operation S510, if the determination unit (106 of FIG. 2) determines that the number of times being cumulated of the current wheel pulse counting signal (WPCI-4 in the detection operation of the first detection unit 102 of FIG. 3) is three that is the number of times being cumulated of the target wheel pulse counting signal, the driving unit (108 of FIG. 2) may drive the electronic parking brake (10 of FIG. 2) according to control of the controller (110 of FIG. 2) so as to re-clamp (A of FIG. 3) the parking operation.

In this case, in the driving operation S510, if the determination unit (106 of FIG. 2) determines that the current wheel pulse counting signal (WPCI-4 in the detection operation of the first detection unit 102 of FIG. 3) is a target wheel pulse counting signal, a reset instruction may be further transmitted to the second detection unit (104 of FIG. 2) according to control of the controller (110 of FIG. 2) so as to reset (B of FIG. 3) the current wheel pulse cumulative counting signal (WPCI-1 in the detection operation of the second detection unit 104 of FIG. 3).

In one example, in the driving operation S510, if the determination unit (106 of FIG. 2) determines that the number of times being cumulated of the current wheel pulse counting signal (WPCI-4 in the detection operation of the first detection unit 102 of FIG. 3) is three that is the number of times being cumulated of the target wheel pulse counting signal, the reset instruction may be further transmitted to the second detection unit (104 of FIG. 2) according to control of the controller (110 of FIG. 2) so as to reset (B of FIG. 3) the current wheel pulse cumulative counting signal (WPCI-1 in the detection operation of the second detection unit of FIG. 3).

On the other hand, in the driving operation S510, if the determination unit (106 of FIG. 2) determines that the current wheel pulse cumulative counting signals (WPCI-2 and WPCI-3 in the detection operation of the second detection unit 104 of FIG. 4) are the target wheel pulse cumulative counting signals, the driving unit (108 of FIG. 2) drives the electronic parking brake (10 of FIG. 2) according to control of the controller (110 of FIG. 2) so as to re-clamp (A of FIG. 4) the parking operation.

In one example, in the driving operation S510, if the determination unit (106 of FIG. 2) determines that the number of times being cumulated of the current wheel pulse counting signals (WPCI-2 and WPCI-3 in the detection operation of the second detection unit 104 of FIG. 4) is three that is the number of times being cumulated of the target wheel pulse counting signals, the driving unit (108 of FIG. 2) may drive the electronic parking brake (10 of FIG. 2) according to control of the controller (110 of FIG. 2) so as to re-clamp (A of FIG. 4) the parking operation.

In this case, in the driving operation S510, if the determination unit (106 of FIG. 2) determines that the current wheel pulse cumulative counting signals (WPCI-2 and WPCI-3 in the detection operation of the second detection unit 104 of FIG. 4) are the target wheel pulse cumulative counting signals, a reset instruction may be further transmitted to the first detection unit (102 of FIG. 2) according to control of the controller (110 of FIG. 2) so as to reset (B of FIG. 4) the current wheel pulse counting signals (WPCI-2 and WPCI-3 in the detection operation of the first detection unit 102 of FIG. 4).

In one example, in the driving operation S510, if the determination unit (106 of FIG. 2) determines that the number of times being cumulated of the current wheel pulse counting signals (WPCI-2 and WPCI-3 in the detection operation of the second detection unit 104 of FIG. 4) is three that is the number of times being cumulated of the target wheel pulse counting signals, a reset instruction may be further transmitted to the first detection unit (102 of FIG. 2) according to control of the controller (110 of FIG. 2) so as to reset (B of FIG. 4) the current wheel pulse counting signals (WPCI-2 and WPCI-3 in the detection operation of the first detection unit of FIG. 4).

The apparatus 100 for controlling the electronic parking brake 10 in accordance with the first embodiment of the present invention and the method 500 of controlling the electronic parking brake 10 includes the first detection unit 102, the second detection unit 104, the determination unit 106, the driving unit 108, and the controller 110, thereby performing the detection operations S502 and S506, the determination operations S504 and S508, and the driving operation S510.

Thus, in the apparatus 100 for controlling the electronic parking brake 10 in accordance with the first embodiment of the present invention and the method 500 of controlling the electronic parking brake 10, there is no need of continuously considering whether a parking state is smoothly formed after parking has been performed, so that conveniences of parking can be further improved.

Figure 6:
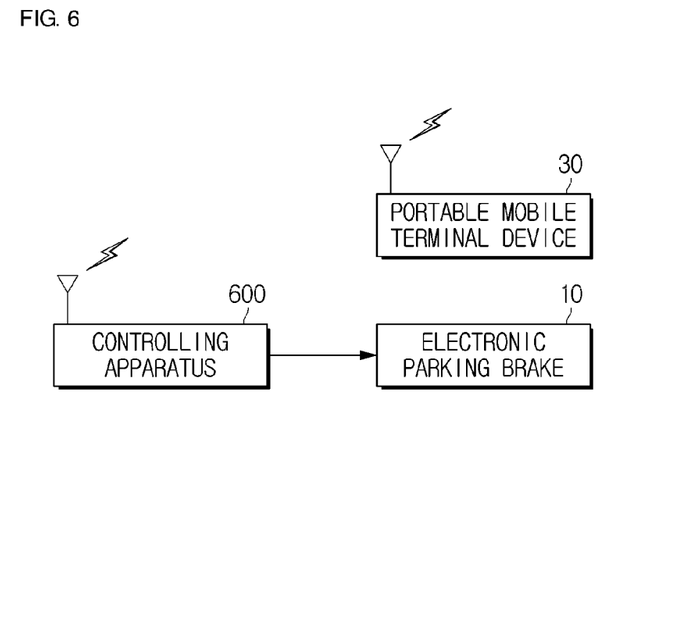
FIG. 6 is a block diagram illustrating a state in which an apparatus for controlling an electronic parking brake in accordance with a second embodiment of the present invention is connected to the electronic parking brake and communicates with a portable mobile terminal device.
Figure 7:
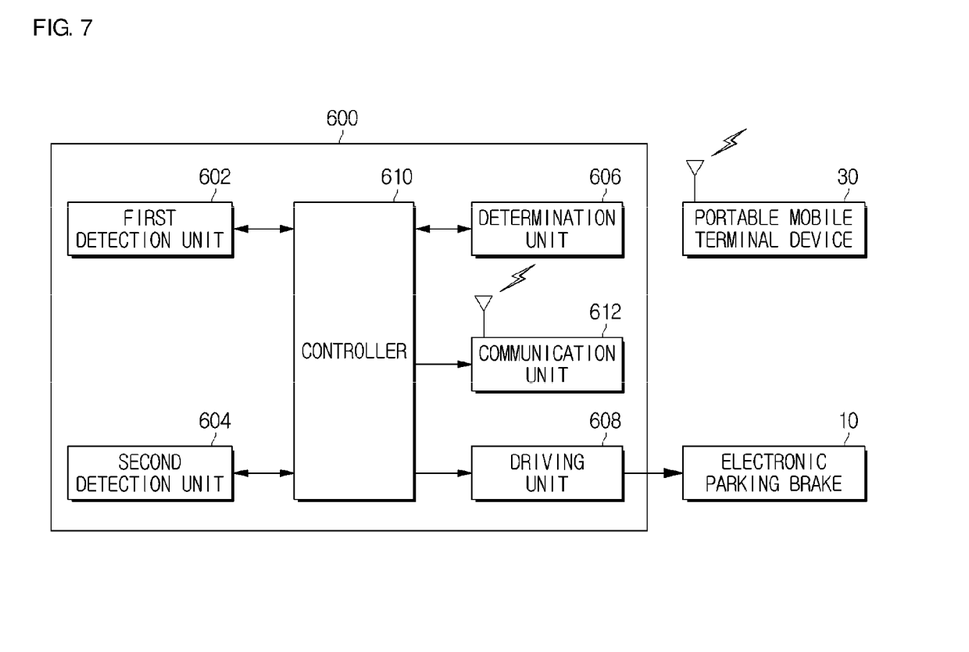
FIG. 7 is a block diagram illustrating the apparatus illustrated in FIG. 6, in one example.

FIG. 6 is a block diagram illustrating a state in which an apparatus for controlling an electronic parking brake in accordance with a second embodiment of the present invention is connected to the electronic parking brake and communicates with a portable mobile terminal device, and FIG. 7 is a block diagram illustrating the apparatus illustrated in FIG. 6, in one example.

Referring to FIGS. 6 and 7, an apparatus 600 for controlling an electronic parking brake 10 in accordance with a second embodiment of the present invention includes a first detection unit 602, a second detection unit 604, a determination unit 606, a driving unit 608, and a controller 610, like in the apparatus (100 of FIGS. 1 and 2) for controlling the electronic parking brake (10 of FIGS. 1 and 2) in accordance with the first embodiment of the present invention.

Since functions of the first detection unit 602, the second detection unit 604, the determination unit 606, the driving unit 608, and the controller 610 of the apparatus 600 for controlling the electronic parking brake 10 in accordance with the second embodiment of the present invention and the close connection relationship therebetween are the same as those of the first detection unit (102 of FIG. 2), the second detection unit (104 of FIG. 2), the determination unit (106 of FIG. 2), the driving unit (108 of FIG. 2), and the controller (110 of FIG. 2) of the apparatus (100 of FIGS. 1 and 2) for controlling the electronic parking brake (10 of FIGS. 1 and 2), hereinafter, detailed descriptions thereof will be omitted.

Here, the apparatus 600 for controlling the electronic parking brake 10 in accordance with the second embodiment of the present invention further includes a communication unit 612.

That is, the communication unit 612 communicates with a driver's portable mobile terminal device 30 according to control of the controller 610.

In this case, if the determination unit 606 determines that current wheel pulse counting signals (WPCI-1 through WPCI-4 in the detection operation of the first detection unit 102 of FIGS. 3 and 4) are not target wheel pulse counting signals, the communication unit 612 may transmit communication signals to the driver's portable mobile terminal device 30 according to control of the controller 610 so that the driver's portable mobile terminal device 30 identifies that a current parking state is unstable.

In addition, if the determination unit 606 determines that the current wheel pulse cumulative counting signals (WPCI-1 through WPCI-3 in the detection operation of the second detection unit 104 of FIGS. 3 and 4) are not the target wheel pulse cumulative counting signals, the communication unit 612 may transmit communication signals to the driver's portable mobile terminal device 30 according to control of the controller 610 so that the driver's portable mobile terminal device 30 identifies that the current parking state is unstable.

In addition, if the determination unit 606 determines that the current wheel pulse counting signals (WPCI-1 through WPCI-4 in the detection operation of the first detection unit 102 of FIGS. 3 and 4) are the target wheel pulse counting signals, the communication unit 612 may transmit communication signals to the driver's portable mobile terminal device 30 according to control of the controller 610 so that the driver's portable mobile terminal device 30 identifies that a current situation is a situation in which a parking operation of the electronic parking brake 10 is to be re-clamped.

In addition, if the determination unit 606 determines that the current wheel pulse cumulative counting signals (WPCI-1 through WPCI-3 in the detection operation of the second detection unit 104 of FIGS. 3 and 4) are the target wheel pulse cumulative counting signals, the communication unit 612 may transmit communication signals to the driver's portable mobile terminal device 30 according to control of the controller 610 so that the driver's portable mobile terminal device 30 identifies that a current situation is a situation in which the parking operation of the electronic parking brake 10 is to be re-clamped.

In addition, the communication unit 612 may transmit communication signals to the driver's portable mobile terminal device 30 according to control of the controller 610 so that the driver's portable mobile terminal device 30 identifies that the current parking state is stable when the driving unit 608 re-clamps the parking operation of the electronic parking brake 10.

Here, although not shown, the communication unit 612 may communicate with the portable mobile terminal device 30 including at least one from among a wireless-fidelity (Wi-Fi) module (not shown), a Zigbee module (not shown), a wireless broadband (Wibro) module (not shown), a Wi-Max module (not shown), a long term evolution (LTE) module (not shown), and an LTE advanced module (not shown).

In this case, although not shown, the portable mobile terminal device 30 may be one from among a personal digital assistant (PDA)(not shown), a smartphone (not shown), a tablet personal computer (PC), a mobile phone (not shown), and a notebook (not shown).

A method of controlling the electronic parking brake 10 by using the apparatus 600 for controlling the electronic parking brake 10 in accordance with the second embodiment of the present invention will be described with reference to FIGS. 8 through 12.

Figure 8:
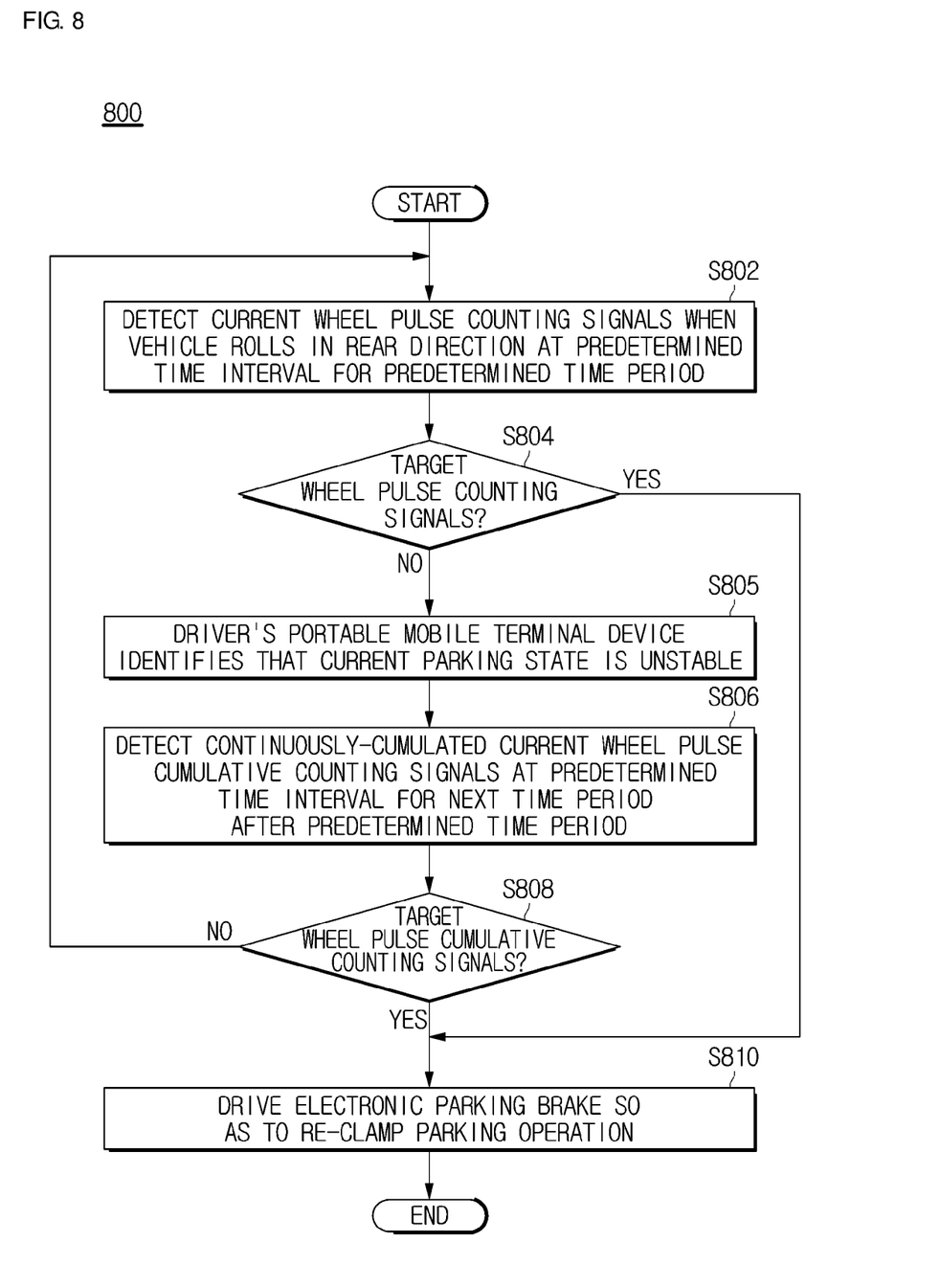
FIG. 8 is a flowchart illustrating a method of controlling an electronic parking brake by using the apparatus for controlling an electronic parking brake in accordance with the second embodiment of the present invention, in one example.
Figure 9:
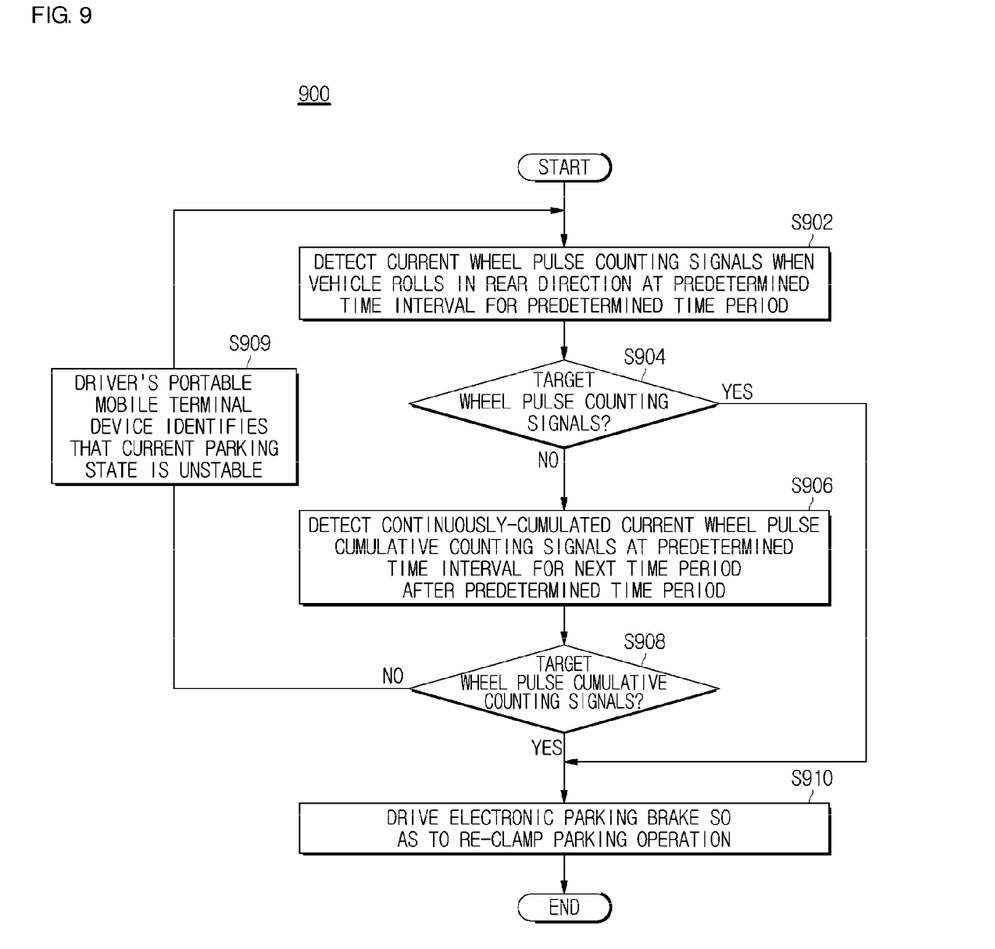
FIG. 9 is a flowchart illustrating a method of controlling an electronic parking brake by using the apparatus for controlling an electronic parking brake in accordance with the second embodiment of the present invention, in another example.

FIG. 8 is a flowchart illustrating a method of controlling an electronic parking brake by using the apparatus for controlling an electronic parking brake in accordance with the second embodiment of the present invention, in one example, and FIG. 9 is a flowchart illustrating a method of controlling an electronic parking brake by using the apparatus for controlling an electronic parking brake in accordance with the second embodiment of the present invention, in another example.

Figure 10:
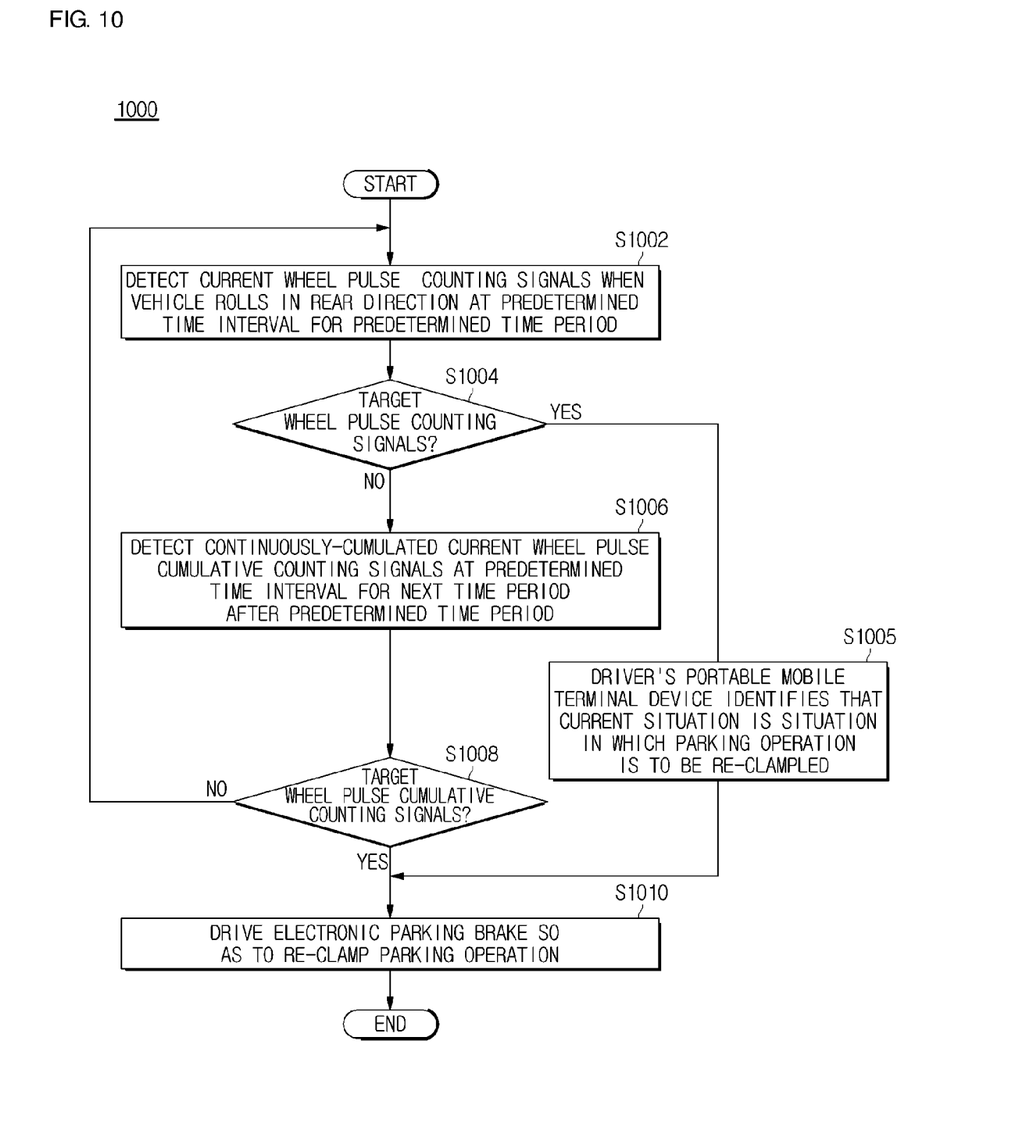
FIG. 10 is a flowchart illustrating a method of controlling an electronic parking brake by using the apparatus for controlling an electronic parking brake in accordance with the second embodiment of the present invention, in another example.
Figure 11:
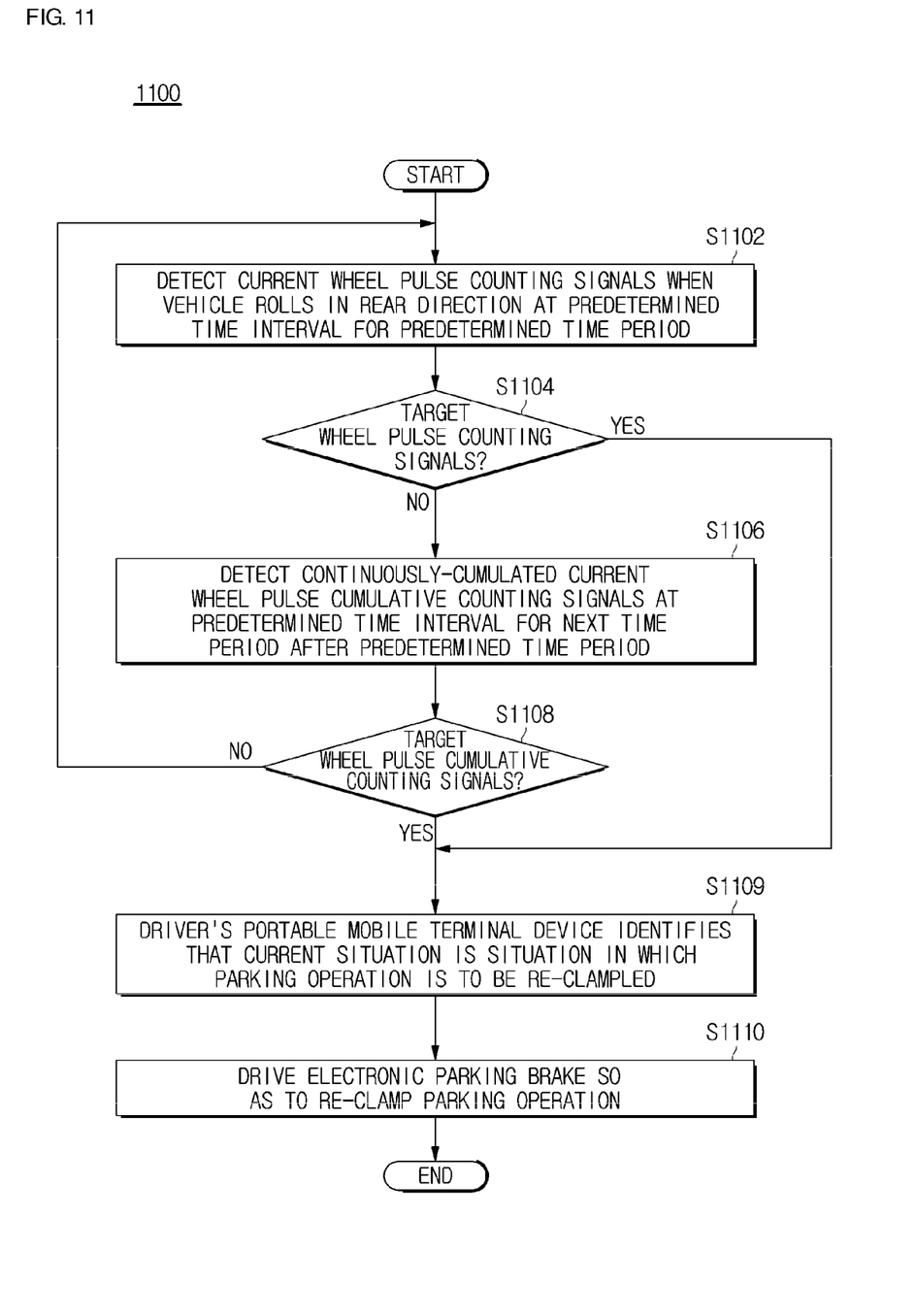
FIG. 11 is a flowchart illustrating a method of controlling an electronic parking brake by using the apparatus for controlling an electronic parking brake in accordance with the second embodiment of the present invention, in another example.

FIG. 10 is a flowchart illustrating a method of controlling an electronic parking brake by using the apparatus for controlling an electronic parking brake in accordance with the second embodiment of the present invention, in another example, and FIG. 11 is a flowchart illustrating a method of controlling an electronic parking brake by using the apparatus for controlling an electronic parking brake in accordance with the second embodiment of the present invention, in another example.

Figure 12:
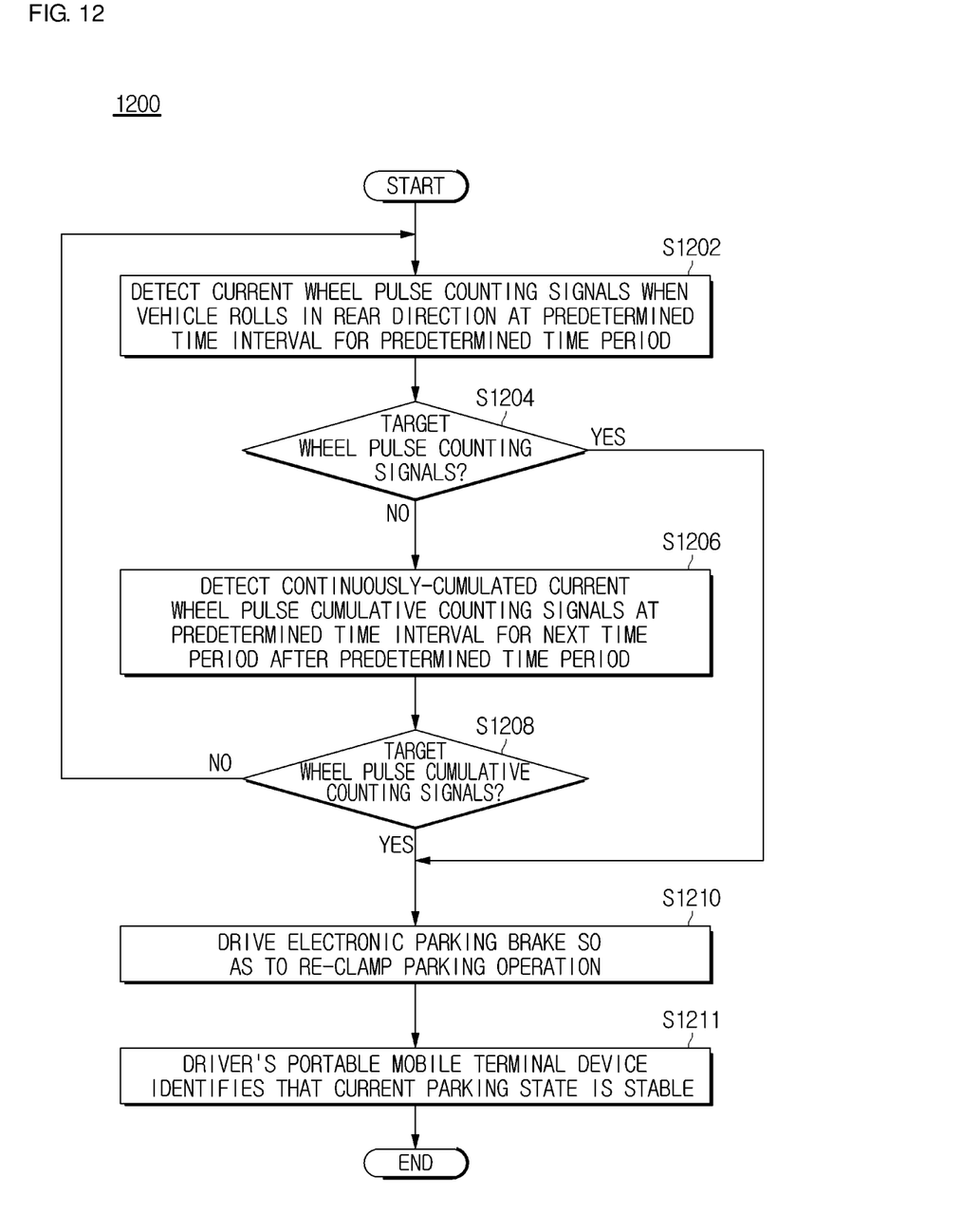
FIG. 12 is a flowchart illustrating a method of controlling an electronic parking brake by using the apparatus for controlling an electronic parking brake in accordance with the second embodiment of the present invention, in another example.

FIG. 12 is a flowchart illustrating a method of controlling an electronic parking brake by using the apparatus for controlling an electronic parking brake in accordance with the second embodiment of the present invention, in another example.

Referring to FIGS. 8 through 12, methods 800 through 1200 by using the apparatus 600 for controlling the electronic parking brake 10 in accordance with the second embodiment of the present invention include detection operations S802 through S1202 and S806 through S1206, determination operations S804 through S1204 and S808 through S1208, and driving operations S810 through S1210, like in the method (500 of FIG. 5) by using the apparatus (100 of FIG. 2) for controlling the electronic parking brake (10 of FIG. 2) in accordance with the first embodiment of the present invention.

Since functions of the detection operations S802 through S1202 and S806 through S1206, the determination operations S804 through S1204 and S808 through S1208, the driving operations S810 through S1210 of the methods 800 through 1200 by using the apparatus 600 for controlling the electronic parking brake 10 in accordance with the second embodiment of the present invention and the close connection relationship therebetween are the same as those of the detection operations (S502 and S506 of FIG. 5), the determination operations (S504 and S508 of FIG. 5), and the driving operation (S510 of FIG. 5) of the method (500 of FIG. 5) by using the apparatus (100 of FIG. 2) for controlling the electronic parking brake (10 of FIG. 2) in accordance with the first embodiment, hereinafter, detailed descriptions thereof will be omitted.

The methods 800 through 1200 of controlling the electronic parking brake 10 by using the apparatus 600 for controlling the electronic parking brake 10 in accordance with the second embodiment of the present invention further include communication operations S805, S909, S1005, S1109, and S1211.

That is, in the communication operations S805, S909, S1005, S1109, and S1211, the communication unit (612 of FIG. 7) may communicate with the driver's portable mobile terminal device (30 of FIG. 7) according to control of the controller (610 of FIG. 7).

In this case, in the communication operation S805, if the determination unit (606 of FIG. 7) determines that the current wheel pulse counting signals (WPCI-1 through WPCI-4 in the detection operation of the first detection unit 102 of FIGS. 3 and 4) are not the target wheel pulse counting signals, the communication unit (612 of FIG. 7) may transmit communication signals to the driver's portable mobile terminal device (30 of FIG. 7) according to control of the controller (610 of FIG. 7) so that the driver's portable mobile terminal device (30 of FIG. 7) identifies that the current parking state is unstable.

In addition, in the communication operation S909, if the determination unit (606 of FIG. 7) determines that the current wheel pulse cumulative counting signals (WPCI-1 through WPCI-3 in the detection operation of the second detection unit of FIGS. 3 and 4) are not the target wheel pulse cumulative counting signals, the communication unit (612 of FIG. 7) may transmit communication signals to the driver's portable mobile terminal device (30 of FIG. 7) according to control of the controller (610 of FIG. 7) so that the driver's portable mobile terminal device (30 of FIG. 7) identifies that the current parking state is unstable.

In addition, in the communication operation S1005, if the determination unit (606 of FIG. 7) determines that the current wheel pulse counting signals (WPCI-1 through WPCI-4 in the detection operation of the first detection unit 102 of FIGS. 3 and 4) are the target wheel pulse counting signals, the communication unit (612 of FIG. 7) may transmit communication signals to the driver's portable mobile terminal device (30 of FIG. 7) according to control of the controller (610 of FIG. 7) so that the driver's portable mobile terminal device (30 of FIG. 7) identifies that a current situation is a situation in which the parking operation of the electronic parking brake (10 of FIG. 7) is to be re-clamped.

In addition, in the communication operation S1109, if the determination unit (606 of FIG. 7) determines that the current wheel pulse cumulative counting signals (WPCI-1 through WPCI-3 in the detection operation of the second detection unit of FIGS. 3 and 4) are the target wheel pulse cumulative counting signals, the communication unit (612 of FIG. 7) may transmit communication signals to the driver's portable mobile terminal device (30 of FIG. 7) according to control of the controller (610 of FIG. 7) so that the driver's portable mobile terminal device (30 of FIG. 7) identifies that a current situation is a situation in which the parking operation of the electronic parking brake (10 of FIG. 7) is to be re-clamped.

In addition, in the communication operation S1211, the communication unit (612 of FIG. 7) may transmit communication signals to the driver's portable mobile terminal device (30 of FIG. 7) according to control of the controller (610 of FIG. 7) so that the driver's portable mobile terminal device (30 of FIG. 7) identifies that the current parking state is stable when the driving unit (608 of FIG. 7) re-clamps the parking operation of the electronic parking brake (10 of FIG. 7).

The apparatus 600 for controlling the electronic parking brake 10 in accordance with the second embodiment of the present invention and the methods 800 through 1200 of controlling the electronic parking brake 10 include the first detection unit 602, the second detection unit 604, the determination unit 606, the driving unit 608, the controller 610, and the communication unit 612, thereby performing the detection operations S802 through S1202 and S806 through S1206, the determination operations S804 through S1204 and S808 through S1208, the driving operations S810 through S1210, the communication operations S805, S909, S1005, S1109, and S1211.

Thus, in the apparatus 600 for controlling the electronic parking brake 10 in accordance with the second embodiment of the present invention and the methods 800 through 1200 of controlling the electronic parking brake 10, there is no need of continuously considering whether a parking state is smoothly formed after parking has been performed, so that conveniences of parking can be further improved.

In addition, in the apparatus 600 for controlling the electronic parking brake 10 in accordance with the second embodiment of the present invention and the method 800 of controlling the electronic parking brake 10, if it is determined that the current wheel pulse counting signals (WPCI-1 through WPCI-4 in the detection operation of the first detection unit 102 of FIGS. 3 and 4) are not the target wheel pulse counting signals, the driver's portable mobile terminal device 30 identifies that the current parking state is unstable, and allows the driver to recognize that the current parking state is unstable, and to take a fast initial countermeasure.

In addition, in the apparatus 600 for controlling the electronic parking brake 10 in accordance with the second embodiment of the present invention and the method 900 of controlling the electronic parking brake 10, if the current wheel pulse cumulative counting signals (WPCI-1 through WPCI-3 in the detection operation of the second detection unit of FIGS. 3 and 4) are not the target wheel pulse cumulative counting signals, the driver's portable mobile terminal device 30 identifies that the current parking state is unstable, allows the driver to recognize that the current parking state is unstable, and to take a fast initial countermeasure.

In addition, in the apparatus 600 for controlling the electronic parking brake 10 in accordance with the second embodiment of the present invention and the method 1000 of controlling the electronic parking brake 10, if the current wheel pulse counting signals (WPCI-1 through WPCI-4 in the detection operation of the first detection unit 102 of FIGS. 3 and 4) are the target wheel pulse counting signals, the driver's portable mobile terminal device 30 identifies that a current situation is a situation in which the parking operation of the electronic parking brake 10 is to be re-clamped, and allows the driver to recognize that a future parking state is stable so that reliability of parking can be further improved.

In addition, in the apparatus 600 for controlling the electronic parking brake 10 in accordance with the second embodiment of the present invention and the method 1100 of controlling the electronic parking brake 10, if it is determined that the current wheel pulse cumulative counting signals (WPCI-1 through WPCI-3 in the detection operation of the second detection unit of FIGS. 3 and 4) are the target wheel pulse cumulative counting signals, the driver's portable mobile terminal device 30 identifies that a current situation is a situation in which the parking operation of the electronic parking brake 10 is to be re-clamped, and allows the driver to recognize that a future parking state is stable so that reliability of parking can be further improved.

In addition, in the apparatus 600 for controlling the electronic parking brake 10 in accordance with the second embodiment of the present invention and the method 1200 of controlling the electronic parking brake 10, when the parking operation of the electronic parking brake 10 is to be re-clamped, the driver's portable mobile terminal device 30 identifies that the current parking state is stable so that the driver is able to recognize that the current parking state is stable and reliability of parking can be further improved.

As described above, in an apparatus and method for controlling an electronic parking brake in accordance with an embodiment of the present invention, conveniences of parking can be improved.

In addition, in an apparatus and method for controlling an electronic parking brake in accordance with an embodiment of the present invention, a driver is able to recognize that a current parking state is unstable and to take a fast initial countermeasure.

In addition, in an apparatus and method for controlling an electronic parking brake in accordance with an embodiment of the present invention, the driver is able to recognize that a future parking state is stable so that reliability of parking can be further improved.

In addition, in an apparatus and method for controlling an electronic parking brake in accordance with an embodiment of the present invention, the driver is able to recognize that the current parking state is stable so that reliability of parking can be further improved.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus for controlling an electronic parking brake, the apparatus comprising:

a first detection unit that detects current wheel pulse counting signals when a vehicle rolls at a predetermined time interval for a predetermined time period after a parking operation for parking is clamped;

a second detection unit that continuously receives the detected current wheel pulse counting signals at a predetermined time interval for a next time period after the predetermined time period and detects the continuously-cumulated current wheel pulse cumulative counting signals;

a determination unit that determines whether the detected current wheel pulse counting signals are predetermined target wheel pulse counting signals or determines whether the detected current wheel pulse cumulative counting signals are predetermined target wheel pulse cumulative counting signals;

a driving unit that drives the electronic parking brake so as to re-clamp the parking operation if it is determined that the current wheel pulse counting signals are the target wheel pulse counting signals or the current wheel pulse cumulative counting signals are the target wheel pulse cumulative counting signals; and a controller that transmits a first detection instruction to the first detection unit, transmits a second detection instruction to the second detection unit, transmits a determination instruction to the determination unit and transmits a driving instruction to the driving unit.

2. The apparatus according to claim 1, wherein the controller further transmits a reset instruction to the second detection unit so as to reset the current wheel pulse cumulative counting signals if the current wheel pulse counting signals are the target wheel pulse counting signals.

3. The apparatus according to claim 2, wherein the controller performs a plurality of re-clamping operations.

4. The apparatus according to claim 1, wherein the controller further transmits a reset instruction to the first detection unit so as to reset the current wheel pulse counting signals if the current wheel pulse cumulative counting signals are the target wheel pulse cumulative counting signals.

5. The apparatus according to claim 4, wherein the controller performs a plurality of re-clamping operations.

6. The apparatus according to claim 1, wherein the first detection unit further detects the current wheel pulse counting signals in real time while a turn-on state of the controller is maintained even when starting of a vehicle is turned off.

7. The apparatus according to claim 6, wherein the controller performs a plurality of re-clamping operations.

8. The apparatus according to claim 1, wherein the second detection unit further detects the current wheel pulse cumulative counting signals in real time while a turn-on state of the controller is maintained even when starting of a vehicle is turned off.

9. The apparatus according to claim 8, wherein the controller performs a plurality of re-clamping operations.

10. The apparatus according to claim 1, further comprising a communication unit that communicates with a driver's portable mobile terminal device according to control of the controller, wherein, if the current wheel pulse counting signals are not the target wheel pulse counting signals, the communication unit transmits communication signals to the driver's portable mobile terminal device so that the driver's portable mobile terminal device identifies that a current parking state is unstable.

11. The apparatus according to claim 1, further comprising a communication unit that communicates with a driver's portable mobile terminal device according to control of the controller,
   wherein, if the current wheel pulse cumulative counting signals are not the target wheel pulse cumulative counting signals, the communication unit transmits communication signals to the driver's portable mobile terminal device so that the driver's portable mobile terminal device identifies that a current parking state is unstable.

12. The apparatus according to claim 1, further comprising a communication unit that communicates with a driver's portable mobile terminal device according to control of the controller,
   wherein, if the current wheel pulse counting signals are the target wheel pulse counting signals, the communication unit transmits communication signals to the driver's portable mobile terminal device so that the driver's portable mobile terminal device identifies that a current situation is a situation in which the parking operation is to be re-clamped.

13. The apparatus according to claim 1, further comprising a communication unit that communicates with a driver's portable mobile terminal device according to control of the controller,
   wherein, if the current wheel pulse cumulative counting signals are the target wheel pulse cumulative counting signals, the communication unit transmits communication signals to the driver's portable mobile terminal device so that the driver's portable mobile terminal device identifies that a current situation is a situation in which the parking operation is to be re-clamped.

14. The apparatus according to claim 1, further comprising a communication unit that communicates with a driver's portable mobile terminal device according to control of the controller,
   wherein the communication unit transmits communication signals to the driver's portable mobile terminal device so that the driver's portable mobile terminal device identifies that a current parking state is stable, when the parking operation is to be re-clamped.

15. The apparatus according to claim 1, wherein the first detection unit detects wheel pulse signals, and the second detection unit detects signals excluding the wheel pulse signals.

16. The apparatus according to claim 1, wherein the controller performs a plurality of re-clamping operations.

17. A method of controlling an electronic parking brake, the method comprising:
   detecting current wheel pulse counting signals when a vehicle rolls at a predetermined time interval for a predetermined time period after a parking operation for parking is clamped, or receiving the detected current wheel pulse counting signals continuously at a predetermined time interval for a next time period after the predetermined time period and detecting the continuously-cumulated current wheel pulse cumulative counting signals;
   determining whether the detected current wheel pulse counting signals are predetermined target wheel pulse counting signals or determining whether the detected current wheel pulse cumulative counting signals are predetermined target wheel pulse cumulative counting signals; and
   if it is determined that the current wheel pulse counting signals are the target wheel pulse counting signals or the current wheel pulse cumulative counting signals are the target wheel pulse cumulative counting signals, driving the electronic parking brake so as to re-clamp the parking operation.

* * * * *